Patented Jan. 1, 1924.

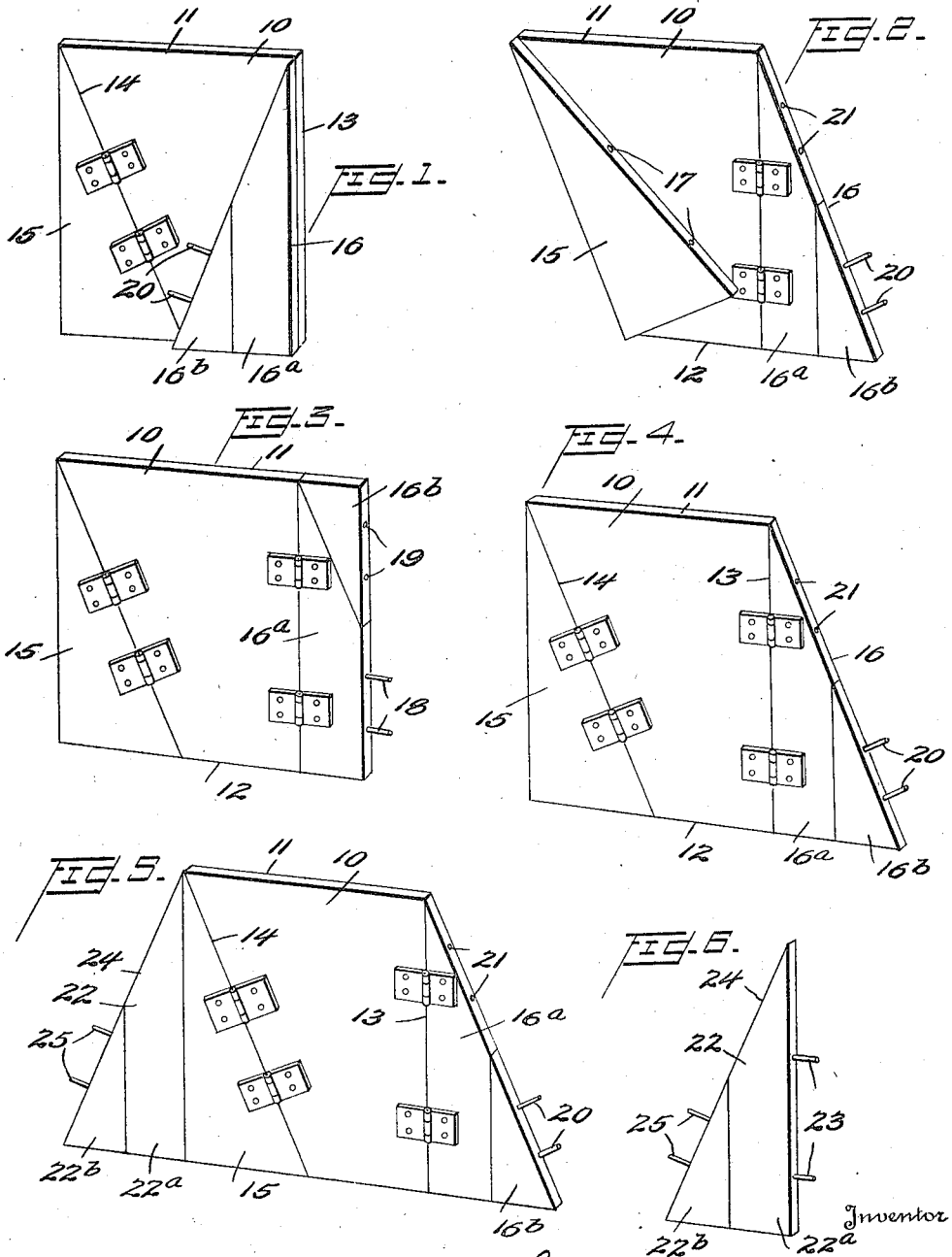

1,479,147

UNITED STATES PATENT OFFICE.

JOHN C. MARKWORTH, OF CLEVELAND, OHIO.

EDUCATIONAL APPLIANCE.

Application filed August 1, 1923. Serial No. 654,974.

*To all whom it may concern:*

Be it known that I, JOHN C. MARKWORTH, a citizen of the United States, residing at Cleveland, in the county of Cuyahoga and State of Ohio, have invented certain new and useful Improvements in Educational Appliances, of which the following is a specification.

This invention has relation to an educational appliance and more particularly to such a device designed for the teaching of mensuration and to illustrate to pupils visually the relationship of plane figures.

The invention has for its object the production of an educational appliance, which will assist in the explanation of the relationship of plane figures, such as quadrilaterals. Another object of the invention is the production of a novel arrangement of hinged and separable parts in a board representation of plane figures. Other objects and advantages of the invention will hereinafter appear in the following description and the novel features thereof will be particularly pointed out in the appended claims.

Like reference characters indicate like parts throughout the several figures of the drawings, in which—

Figure 1 represents the parts of my appliance assembled and folded to form a rectangle;

Figure 2 represents the parts in the shape of a rhomboid;

Figure 3 represents the square formed by the transposition of a small triangle;

Figures 4 and 5 represent trapezoids, and Figure 6 is a composite triangle which is added to the trapezoid of Figure 4 to form that of Figure 5.

My invention may be described as a piece of veneer board having hinged flaps and separable triangles capable of assemblage in various ways to form a series of quadrilateral figures the purpose being to exhibit these several quadrilaterals to children in the school room for the purpose of comparison. It will be understood that the faces opposite those shown in the figures of the drawing are shown to the pupils so that the hinges will not be visible.

The device is made up of a body board 10, which is in the form of a trapezoid having its top 11 and bottom 12 parallel and one edge 13 extending at right angles thereto while the remaining edge 14 is slanted. Along the edges 13 and 14 the body board is provided with hinges, which attach to the board 10 two flaps 15 and 16, made of similar material as the body and of a like width. The flap 15 is in the form of a simple triangle, which when folded out as shown in Figure 1 forms with the body 10 a rectangle. At its outer edge it is provided with bores 17 for the reception of pins as will hereinafter appear.

The flap 16 is composed of two parts, the part 16ª being a small trapezoid and the part 16ᵇ being a triangle. It will be understood that the areas of the flaps 15 and 16 are equal. The two parts of the flap 16 are joined together by means of the pins 18 and bores 19.

In the position of the parts shown in Figure 1, it is obvious that the front face will appear to the pupils as a rectangle. When the flap 15 is folded back behind the body 10 and the flap 16 swung out into view as in Fig. 2, the pupils will see a rhomboid. It will be easy to explain that when a triangle of a given size is removed from the body of Figure 1 and another of the same size added, the area is not changed.

When the flap 15 is again swung back into the position shown in Figure 1, the trapezoid of Figure 4 is formed. The triangle 16ᵇ is then removed from the pins 18 and the pins 20 are inserted in the bores 21 when the square of Figure 3 is formed.

By replacing the triangle 16ᵇ in its position shown in Figures 2 and 4 and adding to the triangle 15 the supplemental triangle 22, the trapezoid of Figure 5 is formed. This supplemental triangle is shown in Figure 6 and is composed of the two parts 22ª and 22ᵇ. It is attached to the flap 15 by means of the pins 23, and it will be appreciated that the part 22ᵇ may be removed from the part 22ª and attached to the edge 24 by means of the pins 25 and bores in the edge 24.

It will also be appreciated that the triangle of Figure 6 may be added to the triangle 16 of Figure 4 to form a rectangle. The triangle of Figure 6 is so constructed as to fit bores 21 and pins 20. The usefulness of my invention can be illustrated by referring to the trapezoid of Figure 5, whose area it may be desired to compute. This trapezoid may be changed to a rectangle in either of two ways. First, the small triangles 16ᵇ and 22ᵇ may be transposed to the tops of respective sides, or second, the whole triangle 22 may be placed upon the triangle 16. After the figure of Figure 5 has been changed, it will be easy to compute its area.

Having described my invention, what I claim as new and desire to secure by Letters Patent of the United States is:

1. In an educational appliance, a board, a pair of flaps hingedly connected to said board, and separate triangular members attachable to said flaps.

2. In an educational appliance, a body board in the form of a trapezoid, and triangular flaps hinged to said body board, said flaps being adapted to lie in the plane of the body or be folded back upon the body.

3. In an educational appliance in the form of a trapezoid consisting of a body board of trapezoidal form having a slant edge and a vertical edge, a triangular flap hinged to the slant edge and a trapezoidal flap hinged to the vertical edge of said body, a separate triangle attachable to said trapezoidal flap to form therewith a larger triangle, and a large triangle attachable to the triangular flap.

In testimony whereof I affix my signature.

JOHN C. MARKWORTH.